United States Patent [19]

Mead

[11] Patent Number: 5,276,522
[45] Date of Patent: Jan. 4, 1994

[54] ELECTRONIC FILM EDITING WITH SYSTEM HAVING TELECINE MODE AND FILM WRITING MODE

[75] Inventor: Terence W. Mead, Herts, United Kingdom

[73] Assignee: Rank Cintel Limited, United Kingdom

[21] Appl. No.: 855,696
[22] PCT Filed: Dec. 19, 1990
[86] PCT No.: PCT/GB90/01980
§ 371 Date: May 5, 1992
§ 102(e) Date: May 5, 1992
[87] PCT Pub. No.: WO91/10315
PCT Pub. Date: Jul. 11, 1991

[30] Foreign Application Priority Data
Dec. 22, 1989 [GB] United Kingdom ............ 8928991

[51] Int. Cl.$^5$ .............. H04N 3/36; H04N 5/335; H04N 9/11; H04N 9/79
[52] U.S. Cl. .................... 358/214; 358/54; 358/217; 358/332
[58] Field of Search .......... 358/214, 215, 216, 217, 358/54, 332, 244; H04N 5/555, 3/36

[56] References Cited

U.S. PATENT DOCUMENTS

| | | | |
|---|---|---|---|
| 2,275,898 | 3/1942 | Goldsmith | 358/214 |
| 2,871,287 | 1/1959 | Harter | 358/214 |
| 3,117,183 | 1/1964 | Mullin | 358/214 |
| 3,693,042 | 9/1972 | Fredkin et al. | 358/214 |
| 3,781,466 | 12/1973 | Brown | 358/214 |
| 3,928,719 | 12/1975 | Sasabe et al. | 358/332 |
| 4,616,926 | 10/1986 | DiPietro et al. | 358/244 |
| 4,769,694 | 9/1988 | Oshikoshi | 358/75 |
| 4,984,086 | 1/1991 | Mumford et al. | 358/214 |
| 5,010,414 | 3/1991 | Clapp | 358/332 |

FOREIGN PATENT DOCUMENTS

| | | |
|---|---|---|
| 0070677 | 1/1983 | European Pat. Off. |
| 8403189 | 8/1984 | PCT Int'l Appl. |
| 8703767 | 6/1987 | PCT Int'l Appl. |

OTHER PUBLICATIONS

Research Disclosure; No. 21702, Single CRT Scanner and Printer Apparatus; pp. 145-146; May 1982.

*Primary Examiner*—Joseph Mancuso
*Assistant Examiner*—Wendy R. Greening
*Attorney, Agent, or Firm*—Ostrolenk, Faber, Gerb & Soffen

[57] ABSTRACT

A telecine can be adapted to write video signals onto film. The film gate and flying spot scanner are enclosed in a light-tight shield and a four-segment (R, G, B, and clear) color filter wheel is interposed in the optical path between the scanner and the imaging optics. The CRT grid is modulated sequentially by R, G, and B components of the video signals which are preprocessed for shading and color errors. The film may be scanned a number of times under the modulation of each component, and displaced in both X and Y directions to increase resolution. In a preferred embodiment, the scan is displaced by ¼-pixel for each of four scans to increase horizontal resolution and, for each horizontal displacement, four scans are performed, spaced ¼-line apart, to increase vertical resolution. Thus, each frame is scanned 16 times per color component, and 48 times in all.

10 Claims, 2 Drawing Sheets

ELECTRONIC FILM EDITING WITH SYSTEM HAVING TELECINE MODE AND FILM WRITING MODE

FIELD OF THE INVENTION

This invention relates to video processing, and in particular to the production of cinematographic or photographic images from video signals.

BACKGROUND OF THE INVENTION

Telecine machines have been known for many years and are widely used in studios for converting cinematographic film into video signals suitable for broadcasting.

One type of telecine is the 'flying spot' telecine in which the film is read by a raster on a cathode ray tube by scanning the film.

There is a general need for equipment which can convert film images into video signals for editing or the addition of special effects and then transfer the video signals back to cinematographic film.

SUMMARY OF THE INVENTION

We have appreciated that a flying spot telecine may be adapted for use as a film writer in which a video signal is transferred onto film.

According to the invention there is provided a film editor comprising a flying spot CRT raster scanner arranged to operate selectively in telecine or film writing mode, the optical path of the scanner being enclosed in a light tight shield and a shutter being interposed between the film gate and color separating mirrors, the editor having means for modulating the CRT raster with each color component of a video signal to be written in film writing mode and a rotatable color filter wheel synchronised with the scanner, the filter wheel having red, green and blue portions which are inserted into the optical path when the scanner is modulated by the red, green or blue signal respectively, and a clear portion which is inserted into the optical path in the telecine mode.

In a system embodying the invention, the video signal is itself derived from a telecine and after editing or other processing is returned to film. It is desirable to increase the resolution of the video signal to an acceptable quality for photographic film. In a preferred embodiment of the invention the resolution is increased in the vertical and horizontal directions by repeating the frame scan with the scanning image displaced by a fraction of a line spacing for vertical resolution and a fraction of a pixel for horizontal resolution. Alternatively resolution may be increased by scanning n times the normal number of pixels in the horizontal direction and n times the number of lines to give an $n^2$ increase in resolution.

It is desirable that the film writer has a very high resolution to achieve a film image of acceptable quality. Existing flying spot telecine machines such as that marketed under the trade mark URSA produce a good quality 625 line sequential video signal. Preferably the resolution of this signal is increased fourfold in both vertical and horizontal directions before being applied to the film. Alternatively, the increase in resolution may be limited to an HDTV (Higher Definition Television) standard for compatibility.

The system is a non-real time system and each frame of film is scanned a number of times for each component of the video signal (i.e. R, G and B). In each case the CRT grid is modulated by a respective one of the R, G, B video signals. Furthermore a corresponding color filter is inserted into the optical path to ensure that the correct colors are exposed on the film.

A system embodying the invention may operate in the telecine mode in which the scanner and associated circuitry operates as a conventional telecine, scanning the film to produce a video signal which is then processed and corrected to provide an output signal which may then be edited when operating in the film writing mode, the edited signal is split into R, G and B components, each of which are used sequentially to modulate the CRT raster to write the signal through the corresponding color filter onto unexposed film.

An editing system embodying the invention has the advantage that a film image can be edited by video and returned to film avoiding the need for reshooting and greatly simplifying and reducing the cost of editing.

BRIEF DESCRIPTION OF THE DRAWINGS

An embodiment of the invention will now be described by way of example, and with reference to the accompanying drawings, in which.

DESCRIPTION OF PREFERRED EMBODIMENT

Figure 1:
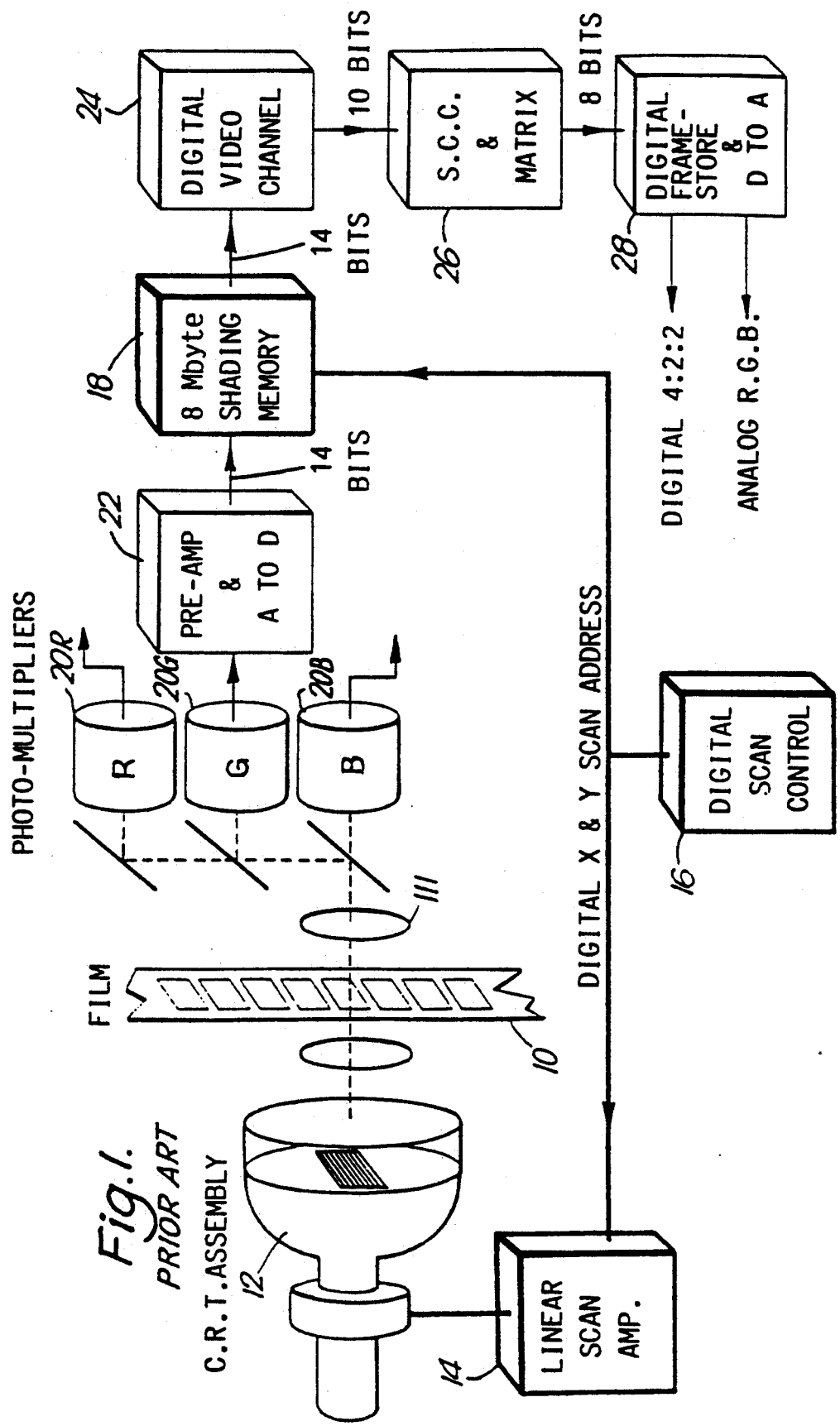
FIG. 1 is a block diagram of a known digital flying spot telecine.

The telecine of FIG. 1 is a schematic representation of the applicant's digital flying spot telecine sold under the Trade Mark URSA. Exposed photographic or cinematographic film 10 is scanned by a beam of light produced by a Cathode Ray Tube 12. The scan is conventionally a raster scan which scans the film in a series of lines from left to right. Various modifications to the scanning pattern have been proposed to achieve special effects.

The path of the electron beam is controlled by digital scan control 16 which uses a look up table of X and Y scan coordinates. These coordinates are provided to the X and Y coils of the CRT 12 via a linear scan amplifier 14.

Light transmitted by the film on scanning is detected by R, G and B photomultipliers 20, the outputs of which are processed separately to produce three color signals. Initially the color components are amplified and converted into digital signals at 22. Then, the signals are weighted to compensate for shading errors.

Weighting factors are stored in 8 Mbyte shading memory 18 and applied to the 14 bit digital colour signal on a pixel by pixel basis under the control of the digital scan control 16 to ensure that the correct weighting factor is applied to each pixel. The weighted colour component signals are then processed in the video channel 24, still as 14 bit signals. In the video channel 24, color masking, gamma correction and light gain control take place. The output signal is a 10 bit signal which is passed to secondary color corrector 26 and a color matrix where color difference signals are formed. The signals are output from the matrix in 8 bit form and stored in a frame store 28 from where they can be output in digital form, or, via a digital to analog converter in analog form.

In summary, the telecine described reads exposed film and transforms it into a video signal in either digital or analog form.

Figure 2:
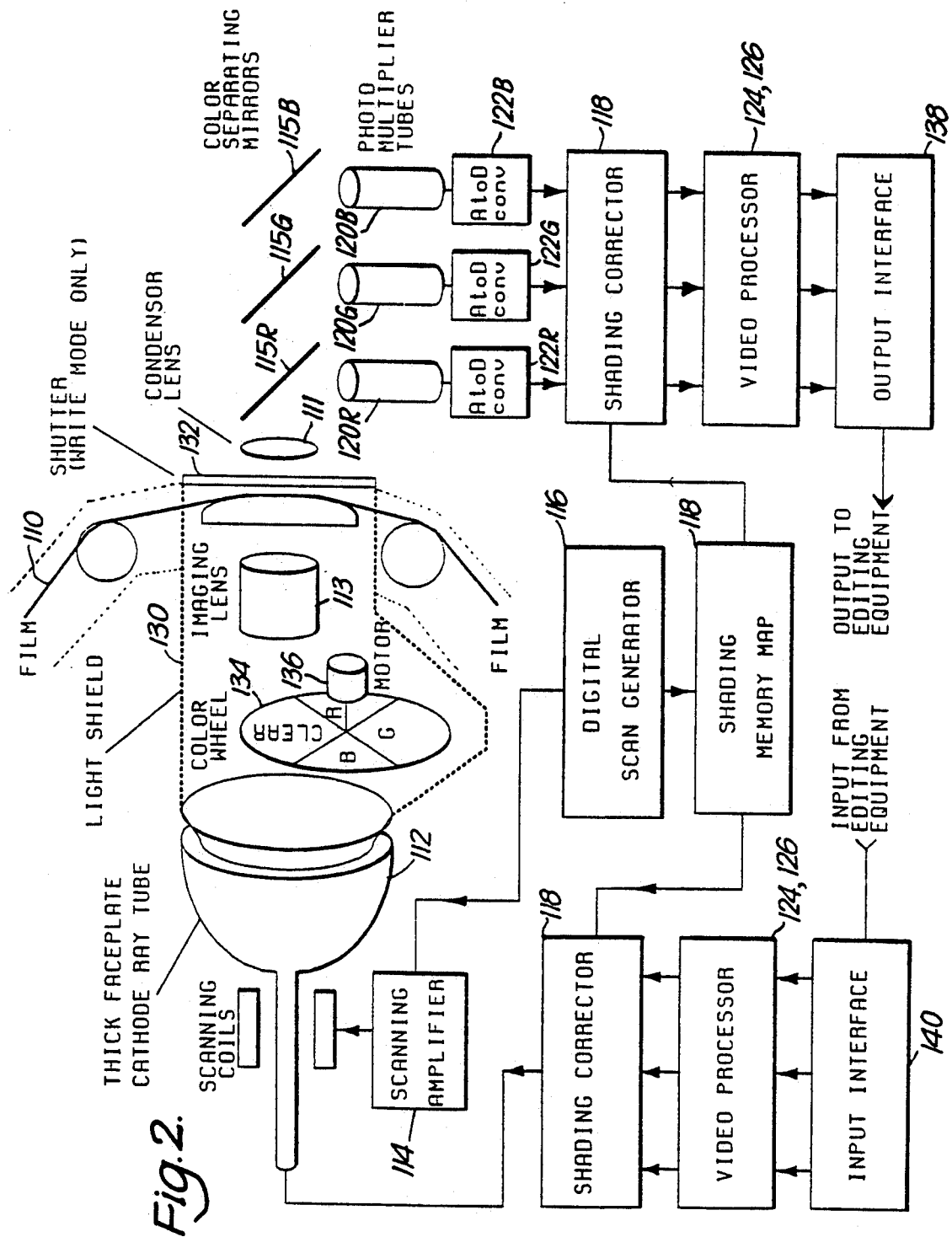
FIG. 2 is a block diagram showing a film editing system in which the telecine of FIG. 1 can operate in both telecine and film writing modes.

FIG. 2 shows a film editor in which a flying spot telecine as described previously is combined with a flying spot film writer. In fact, the same cathode ray tube is used and much of the processing circuitry is common. In FIG. 2, elements already described with respect to FIG. 1 are identified by the same reference numeral with the addition of 100. These elements will not be described again.

The film writer portion of the device comprises the CRT 112 together with scan circuitry 114 and 116. As the film writer operates on unexposed film, it is necessary that the optical path is light tight. Thus, light shield 130 surrounds the film gate, the optical path and the faceplate of the CRT. A shutter 132 is placed between the film gate and the condensor lens 111. In the write mode this shutter is closed. Preferably, the faceplate of the CRT is a thick faceplate as described in our published British application GB-A-2199443. Such a faceplate has a thickness of about 8.5 cms and substantially reduces flare. The film is written by modulating the CRT grid sequentially with the R, G or B signals of the video signal to be transferred onto film. Thus, the unexposed film will first be scanned by the CRT modulated by the red signal. Then the film will be scanned again with the CRT grid modulated by the green signal and finally the film will be scanned a third time with the CRT modulated by the blue signal. Thus, the film writing operation is a non-real time operation.

In order to ensure that the correct colour is written onto the unexposed film, a color filter wheel 134 is interposed in the optical path between the CRT 112 and the imaging lens 113. The color wheel 134 is driven by a motor 136 and comprises four segments, a clear portion, a blue filter, a green filter and a red filter. In the telecine mode, the clear filter is advanced into the optical path and in the film writing mode a color filter corresponding to the particular component signal modulating the CRT is driven by the motor into the optical path.

Operation of the film editor will now be described. A film to be edited is first applied to the equipment in telecine mode. In this mode the clear filter is in the optical path, the shutter 132 is open and an unmodulated raster used to scan the film to produce a video signal. In this respect, operation is as described with respect to FIG. 1. The output signal from the video processor 126 is passed to an output interface 138 which provides an output to the editing equipment and also provides the necessary signal multiplexing and sequential to interlace conversion if required by the editing equipment.

Although the URSA flying spot telecine produces a good quality 1.25 line digital color video signal which can be used for monitoring purposes, the resolution is not sufficient to produce acceptable film quality. Thus, the telecine and film writing stage must include an increase in the horizontal and vertical resolution of the image. The method used is the same in both cases and is described hereafter.

The edited signal is returned from the editing equipment to the system which is now in write mode. That is, the CRT is modulated by the signal, the filter wheel selects red, green or blue in sequence and the shutter 132 is in place blocking the light path from the film to the color separating mirrors 115.

The unexposed film 110 is passed through the film gate one frame at a time, each frame being exposed in sequence to red, green and blue light by means of the color wheel. The signal from the editing equipment is input via a suitable interface 140 to the video processor 124, 126 which corrects the gamma and pre-compensates for film color analysis errors. The output from the video processor is then pre-corrected to compensate for the shading of the CRT and optical system in a manner similar to the telecine mode, and then applied to the grid of the CRT to modulate the brightness of the CRT.

The first frame is then scanned under the control of the, e.g., red signal. To increase vertical resolution, the scan is repeated with the scanning image displaced by ¼ line. This process is repeated a further two times and the horizontal resolution is then increased by repeating each of the four frame scans with the scanning image displaced by ¼ pixel each time. The result is 16 frame scan for a single film frame. The circuitry required to implement the scanning shifts to the desired accuracy is already present in the URSA telecine and is described, for example, in our co-pending application WO90/07842 where scan shifting is used to locate blemishes on the CRT face or in the optical path. Suitable timing of the scans may either be implemented in hardware or software.

Once 16 scans have been performed under the control of the red signal, the filter wheel is stepped to the next color, e.g., green and the film is scanned a further 16 times in the manner previously described with the CRT grid modulated by the green signal. Thus, one frame of film is scanned 48 times to produce a completely exposed frame. Thus, under normal operating conditions, one frame of film is written every two or three seconds. The film gate is a pin registered intermittent motion gate which is arranged to advance the film by 1 frame every 48 frame scans. This method of transport ensures the best picture stability.

Rather than increasing the resolution four times in each of the vertical and horizontal directions, the resolution may be increased to an HDTV standard for equipment compatibility. The degree of enhancement of resolution is a matter of choice dependent on the desire for compatibility and the result and quality of written picture on the film.

Rather than scanning the initial picture 16 times using offset horizontal and vertical positioning, an alternative method would be to scan four times as many pixels on each line. This would increase the line duration fourfold and then four times as many lines would need to be scanned in order to obtain the same 16 fold resolution overall. Again a frame duration of 16 times real time length would be obtained. This method is not compatible with the existing standard output used for monitoring purposes.

I claim:

1. A film editor, comprising flying spot CRT raster scanner means arranged to operate selectively in a telecine mode or a film writing mode, the scanner means having a film gate;
   a) in said telecine mode, said scanner means scanning exposed cinematographic film introduced into the film gate, with a flying spot, to derive an output video signal representative of images exposed on said film, the flying spot defining an optical path extending from the scanner means to said film in said film gate;
   color separating mirrors being arranged to receive light which passes through said film upon scanning with said flying spot, for separating said light into primary color components for processing to derive said output video signal; and b) in said film writing mode, said film editor having and employing modulating means for modulating the CRT raster with red, green and blue color components of an input video signal to be written on unexposed film in said film gate;

the scanner means further comprising:

a light-tight shield enclosing said optical path, and including a shutter which is movable for being interposed between the film gate and said color separating mirrors when said scanner operates in said film writing mode; and color filter means having red, green and blue portions arranged to be inserted into said optical path within said light-tight shield when said scanner means is modulated by the red, green or blue color component respectively in said film writing mode, and a clear portion which is arranged for insertion into said optical path in said telecine mode.

2. A film editor according to claim 1, further comprising means for increasing resolution of said input video signal to be written on said unexposed film.

3. A film editor according to claim 2, wherein said means for increasing resolution increases said resolution prior to operation of said editor in film writing mode.

4. A film editor according to claim 1, wherein said input video signal to be written on said unexposed film in film writing mode is derived from said output video signal produced in telecine mode.

5. A film editor according to claim 1, wherein said color filter means includes a rotatable color filter wheel.

6. A film editor according to claim 2, wherein the resolution increasing means comprises means for increasing vertical resolution having means for scanning a frame of film a plurality of times, and means for displacing the scanning image by a fraction of a video line spacing for each of said plurality of scans.

7. A film editor according to claim 2, wherein the resolution increasing means comprises means for increasing horizontal resolution and having means for scanning a frame of film a plurality of times, and means for displacing the scanning image by a fraction of a video line pixel for each of said plurality of scans.

8. Apparatus according to claim 2, wherein the means for increasing resolution of the telecine video signal comprises means for increasing horizontal resolution and vertical resolution including:

means for scanning a frame of film a plurality of times;

means for displacing the scanning image relative to the scan by a fraction of a video line spacing for each scan; and means for displacing the scanning image relative to the scan by a fraction of a video line pixel for each scan.

9. A film editor, comprising flying spot CRT raster scanner means arranged to operate selectively in a telecine mode or a film writing mode, the scanner means having a film gate;

a) in said telecine mode, said scanner means scanning exposed cinematographic film introduced into the film gate, with a flying spot, to derive an output video signal representative of images exposed on said film, the flying spot defining an optical path extending from the scanner means to said film in said film gate;

color separating mirrors being arranged to receive light which passes through said film upon scanning with said flying spot, for separating said light into primary color components for processing to derive said output video signal; and b) in said film writing mode, said film editor having and employing modulating means for modulating the CRT raster with color components of an input video signal to be written on unexposed film in said film gate;

the scanner means further comprising:

a light-tight shield enclosing said optical path, and including a shutter which is movable for being interposed between the film gate and said color separating means when said scanner operates in said film writing mode; and color filter means having colored portions corresponding to the color components of said input video signal and arranged to be inserted into said optical path within said light-tight shield when said scanner means is modulated by the corresponding color component in said film writing mode, and a clear portion which is arranged for insertion into said optical path in said telecine mode.

10. A film editor according to claim 9, wherein said color filter means includes a rotatable color filter wheel.

* * * * *